United States Patent [19]
Hashizume

[11] Patent Number: 6,123,465
[45] Date of Patent: Sep. 26, 2000

[54] OPTICAL MODULE

[75] Inventor: Hideki Hashizume, Osaka, Japan

[73] Assignee: Nippon Sheet Glass Company LTD, Osaka, Japan

[21] Appl. No.: 08/822,086

[22] Filed: Mar. 20, 1997

[30] Foreign Application Priority Data

Mar. 21, 1996 [JP] Japan ................................ 8-091913

[51] Int. Cl.⁷ .................................................. G02B 6/36
[52] U.S. Cl. ............................ 385/93; 385/34; 385/35
[58] Field of Search ............................... 385/88–94, 33, 385/34, 35

[56] References Cited

U.S. PATENT DOCUMENTS

| | | | |
|---|---|---|---|
| 5,333,224 | 7/1994 | Kikuchi et al. | 395/93 |
| 5,388,171 | 2/1995 | Michikoshi et al. | 385/36 |
| 5,542,018 | 7/1996 | Kuhara et al. | 385/92 |
| 5,546,490 | 8/1996 | Kikuchi et al. | 385/93 |
| 5,835,514 | 11/1998 | Yuen et al. | 372/36 |

FOREIGN PATENT DOCUMENTS

| | | |
|---|---|---|
| 3-107807 | 5/1991 | Japan . |
| 3-132708 | 6/1991 | Japan . |
| 4-1502 | 1/1992 | Japan . |
| 4-181904 | 6/1992 | Japan . |
| 4-223412 | 8/1992 | Japan . |
| 4-237004 | 8/1992 | Japan . |

*Primary Examiner*—Hung N. Ngo
*Attorney, Agent, or Firm*—Whitham, Curtis & Whitham

[57] ABSTRACT

The optical module has a semiconductor light emitting device, a lens, a holder for the device and the lens, and a receptacle core onto which a ferule of a counter optical plug is to be fitted. When the optical plug is connected, the semiconductor light emitting device is optically coupled with an optical fiber in the ferule by the lens. A step portion which forms a circular opening with setting the optical axis as the center axis and which eliminates coupling undesired light is disposed at a position which is on an emission side of the lens with respect to a contacting position of the holder and the lens. Preferably, the optical module satisfies the following expressions:

$$0.9 < \phi/(NA \times L_1) < 1.3 \text{ and } L_2 < L_1/2$$

where $\phi$ is a diameter of the circular opening, NA is a numerical aperture of the optical fiber, $L_1$ is a distance between an opening end on the side of the lens and the optical fiber, and $L_2$ is a distance between an end of the lens and the opening end on the side of the lens.

12 Claims, 7 Drawing Sheets

OPTICAL MODULE

BACKGROUND OF THE INVENTION

1. Field of the Invention

This invention relates to an optical module which optically couples an optical semiconductor device with an optical fiber by a lens, and a method of producing the optical module. Such an optical module is useful as, for example, a light emitting device or a light receiving device in an optical LAN or the like, or a light source in a bar code reader.

2. Background

An optical module is an optical part in which various optical semiconductor devices are incorporated, and includes an optical connector, an optical collimator, etc. Such an optical module is used in various fields. For example, an optical connector used in the field of optical communication is an optical module which optically couples a semiconductor light emitting device or a semiconductor light receiving device with an optical fiber. In a computer system in which data communication is conducted by an optical LAN or the like, a module of a semiconductor light emitting device and that of a semiconductor light receiving device are paired with each other on a circuit board. Specifically, such a module includes an optical semiconductor device (for example, a semiconductor light emitting device such as a laser diode, or a semiconductor light receiving device such as a photodiode), a lens, and a receptacle core for fittingly holding a ferule of a counter optical plug. The module has a structure in which, when the optical plug is connected, the optical semiconductor device is optically coupled with an optical fiber in the ferule by the lens. An optical collimator which serves as a light source for a bar code reader has a function of converging light emitted from the laser diode by means of a lens so that a specified beam size is obtained at a position separated by a predetermined distance.

In an optical module into which a semiconductor light emitting device is incorporated, when an optical fiber is pulled out from the optical module during operation, light emitted from the semiconductor light emitting device is emitted to the outside as it is. For a laser apparatus, in order to ensure the safety of the human body, a laser safety standard has been established in accordance with the degree of danger with respect to the light amount. An optical module is desired to satisfy class 1. In "class 1," under any conditions, the light amount does not exceed the MPE (Maximum Permissible Exposure) for the eye, safety is ensured in design, and special management is not required.

In order to satisfy the laser safety standard of class 1, an electronic shutter mechanism which is called an open fiber control has been developed. This mechanism operates so that, when an optical fiber is pulled out from an optical module, the driving of a semiconductor light emitting device is electronically stopped. Furthermore, a mechanical shutter mechanism has been developed in which, when an optical fiber is pulled out from an optical module, light emitted from a semiconductor light emitting device is prevented from leaking out of the optical module (see Unexamined Japanese Patent Publication No. Hei. 3-132708).

When the laser output is greater than a certain level, the additional disposition of a shutter mechanism of any kind which satisfies the laser safety standard is necessary and effective. By contrast, in the case of a laser of a low output power, for example, the use of an electronic shutter mechanism requires a larger number of electronic parts (such as ICs), and that of a mechanical shutter mechanism requires a larger number of parts and makes the assembling process complicated. Both the uses are disadvantageous also in the view point of cost. In the event that trouble occurs in such a shutter mechanism, it is impossible to satisfy the safety standard. Therefore, there arises a problem in that, as the structure is more simplified, the reliability is more impaired.

The method which is simplest and has high reliability is to suppress the amount of light emitted from a laser to a range where the safety standard of class 1 for laser apparatuses is satisfied. When the light amount of the output of the laser is merely reduced, however, the properties of the optical module may be lowered.

In an optical module of this kind, conventionally, a configuration is employed in which a ferule stopper is disposed in a receptacle core so that the position of the ferule in the optical axis is positioned in the connecting process (for example, see Unexamined Japanese Patent Publication No. Hei. 4-181904, etc.). A through hole which is small as compared with a lens diameter is formed in the ferule stopper so that a light beam can pass therethrough. Principally, undesired light can be eliminated by sufficiently reducing the diameter of the through hole positioned in the vicinity of the end face of the fiber. In order to establish such a configuration, however, a fine hole must be correctly opened because the through hole is formed at a position where the coupled light beam has a very small diameter (about 100 $\mu$m$\phi$). In order to correct a positional displacement in a direction perpendicular to the optical axis, moreover, centering must be conducted. Consequently, an optical module having such a structure cannot be produced economically and efficiently.

On the other hand, a spherical lens or a rod lens is generally used as a lens for an optical module. It is a matter of course that a lens of another kind may be used. Among lenses of various kinds, a spherical lens is widely used because of its advantages that a highly accurate product can be easily obtained only by mechanical processing and hence the cost is low, and that the lens has no directionality and hence it is not required to adjust the direction when the lens is to be mounted in an optical module, thereby facilitating the assembly work. Known methods of fixing a lens to a holder include welding using low-melting glass, adhesion using a resin adhesive, soldering, and a mechanical fixation in which an annular elastic member is fitted. Among these methods, the adhesion method has a drawback that a liquid adhesive must be poured into a narrow region and it is difficult to handle such an adhesive before hardening. When soldering is to be performed, a lens must be metalized. Particularly, it is difficult to metalize a spherical lens. Furthermore, metalization causes the lens to have directionality, and hence the mounting work is complicated. The mechanical press fitting and fixation requires additional parts such as an annular elastic member, and hence has drawbacks that the assembly work is complicated, and that the cost is increased. Because of these reasons, the welding method using low-melting glass is advantageous and widely used.

Specifically, an annular low-melting glass compact obtained by press-molding powder of low-melting glass (having a melting point of, for example, about 365° C.) into an annular shape is used. The low-melting glass compact is placed on a step portion of an inner wall of a holder which supports a lens. The assembly is placed in an oven and subjected to a heat treatment at about 400° C. The low-melting glass compact melts, and the lens 50 is welded to the holder 52 as shown in FIG. 1. The glass pool formed as a result of solidification of the melting low-melting glass compact is designated by 54.

When a part in which a device is placed in a hermetically sealed package is used as an optical semiconductor device, a holder which holds a lens is not required to be hermetically sealed. Therefore, the outside air containing moisture easily enters the interior of the holder. As described above, the annular low-melting glass compact used in the glass welding is obtained by press-molding powder of low-melting glass. During the process of dropping the compact to a predetermined position, therefore, fine pieces or powder may be scattered and adhere to the surface of the lens. When, in order to fix the lens, heat melting processing is conducted without taking a countermeasure, the adhering pieces or powder melt and the low-melting glass itself penetrates, whereby films of low-melting glass are locally formed on the surface of the lens. Particularly, low-melting glass is easily affected by moisture. With the passage of time, devitrification (cloudiness) is often produced. As a result, as shown in FIG. 1, devitrified portions 56 caused by films of low-melting glass are formed. The formation of such devitrified portions results in a reduced light amount of the optical module.

Moreover, the outside air containing moisture easily reaches the portion of the glass pool (low-melting glass) inside the holder. The moisture causes a phenomenon where fine cracks are formed in the surface of the glass pool and the glass becomes brittle. This phenomenon reduces the strength of the fixation of the lens. In an extreme, case, the lens may drop off.

In order to solve these problems, it may be contemplated to employ several methods. In order to prevent low-melting glass from being devitrified, fine powder or pieces adhering to the surface of the lens may be removed away before heat melting processing. As a matter of fact, however, a work of completely removing away such fine powder or pieces of low-melting glass is very difficult to do. Even if such removal is realized, low-melting glass inevitably penetrates during heat melting processing, and it is impossible to prevent the formation of cracks in the surface of the glass pool from occurring. The interior of the holder which holds the lens may be hermetically sealed. However, the cost is increased and the structure is complicated. As another countermeasure, glass which is relatively hardly devitrified may be used. However, glass having such properties and excellent moisture resistance has a high melting point. Therefore, it is difficult to use such glass as a welding material for a lens.

In order to comply with the use of an optical module or properties required of an optical module, occasionally, an optical filter film of any kind is formed on the surface of a lens which is to be incorporated into the optical module. For example, such a film includes an ND (Neutral Density) filter film for adjusting the light transmittance, and an antireflection coat film. Generally, these films are formed by the physical vapor deposition method such as the vacuum deposition method.

In the case of using a spherical lens, for example, when an optical filter film of any kind is to be formed on the surface of the spherical lens, the spherical lens must be held by lens holding means such as a fixture. Specifically, the film growth is conducted in the following manner. A number of spherical lenses are arranged on and fixed to a fixture, and the assembly is placed in a film growth chamber for vacuum deposition. Therefore, the film growth is not naturally CAW conducted on a part of the surface of the spherical lens (the portion gripped by the fixture). As a result, although a spherical lens is used, directionality is produced depending on the existence and nonexistence of the optical filter film.

When the spherical lens is to be mounted in the holder, therefore, the direction is first adjusted so that the optical filter film exists on and in the vicinity of the optical axis, and thereafter the lens is fixed to the holder. However, the work of fixing the lens to the holder with detecting the distribution of the thin film on the sphere is very cumbersome and hence the assembly work is poor in efficiency. In other words, directionality is produced in a spherical lens which is originally free from directionality, by the film growth, and this directionality largely impedes the lens mounting work.

In order to comply with the above, a countermeasure may be taken in the following manner. A spherical lens is cut into a column-like shape and an optical filter film is formed on remaining spherical portions, or an optical filter film is formed on the surface of a spherical lens and thereafter portions including the portion gripped by the fixture are cut away, thereby obtaining a structure in which a substantially column-like shape is attained, a spherical face remains on the end faces, and the optical filter film is formed on the spherical faces. The obtained lens is dropped into a holder with using the columnar face. According to this countermeasure, the improved shape facilitates the direction adjustment, but the cutting work must be performed on each lens, with the result that the lens is expensive.

SUMMARY OF THE INVENTION

It is an object of the invention to provide an optical module which can solve the problems of the prior art, and in which the mechanical structure is not complicated, the cost is not increased, properties required of an optical module are not lowered, and a desired laser safety standard can be satisfied.

It is another object of the invention to provide a method of producing an optical module in which, even when fine pieces or powder of low-melting glass adhere to the surface of a lens as a result of welding using the low-melting glass, devitrification is prevented from occurring, and hence the light amount of the optical module is not reduced and the strength of the fixation of the lens is not impaired, whereby a product of high reliability can be obtained. It is a further object of the invention to provide a method of producing an optical module in which, in the case where a spherical lens is used, for example, a moisture protective film or an optical filter film is formed on the surface, but the direction adjustment during the work of mounting the lens is not necessary and the assembly process can be simplified, whereby an optical module can be produced easily and economically.

The optical module of the invention includes a semiconductor light emitting device, a lens, a holder in which the lens is incorporated, and a receptacle core for fittingly holding a ferule of a counter optical plug, and is structured so that, when the optical plug is connected, the semiconductor light emitting device is optically coupled with an optical fiber in the ferule by the lens. According to the invention, a step portion which forms a circular opening with setting an optical axis as a center axis and which eliminates coupling undesired light is disposed at a position which is on an emission side of the lens with respect to a contacting position of the holder and the lens.

Preferably, the circular opening is set to have a size and a position which satisfy the following expressions:

$$0.9 < \phi/(NA \times L_1) < 1.3 \text{ and } L_2 < L_1/2$$

where $\phi$ is a diameter of the opening, NA is a numerical aperture of the optical fiber, $L_1$ is a distance in an optical axis direction between an opening end on the side of the lens and the optical fiber, and $L_2$ is a distance in the optical axis direction between an end of the lens and the opening end on the side of the lens.

In the method of producing an optical module of the invention, a lens is welded to an interior of a holder using low-melting glass, and thereafter a moisture protective film is formed by a physical vapor deposition method on faces of the lens and a glass pool, the faces opposing an opening of the holder. Preferably, a spherical lens is used as the lens. As the holder, preferably, used is a member which has a substantially cylindrical shape and in which a ratio a/b of a diameter a of the opening to a depth b from the opening to the spherical lens is 1 or more. An example of the moisture protective film is an $SiO_2$ film of a thickness of 30 to 200 nm. This film can be formed by the vapor deposition method. Alternatively, in place of the moisture protective film, an optical filter film may be used. As the optical filter film, an ND (Neutral Density) filter film which adjusts the light transmittance and which is formed by vacuum deposition of a metal having an optical absorbing property, an antireflection coat film, or the like may be used.

Light emitted from the semiconductor light emitting device is refracted by the lens and then converged on the end face of the optical fiber. At this time, part of light is not related to the coupling with the optical fiber, i.e., coupling undesired light is produced. This is caused by the aberration of the lens itself and also by diffraction and scattering due to a fixing material penetrating from the contacting position of the holder and the lens. When an optical fiber is pulled out from an optical module of the prior art, light coupled to the optical fiber and also the coupling undesired light are emitted together from the receptacle core. When the coupling undesired light can be eliminated (blocked), the resulting total amount of emitted light is reduced. Therefore, the optical module can comply with the restrictions on the light amount of the safety standard of class 1 for laser apparatuses, while maintaining the light amount required of properties as an optical module. As a result, it is not necessary to take a special countermeasure such as the open fiber control. In consideration of the above, in the invention, a step portion which forms a circular opening is disposed in the holder, so that the coupling undesired light is eliminated, thereby attaining the objects.

When the step portion which forms a circular opening is integrally formed at a position which is on a lens emission side with respect to a contacting position of the holder and the lens, the coupling undesired light which enters from the periphery of the lens can be blocked by the step portion. When the circular opening is disposed in the vicinity of the lens, undesired ambient light can be eliminated under the state where emitted light is directed. Therefore, the allowance of the size of the opening can be relaxed and the holder can be produced very easily. Actually, the step portion is integrated with the holder and can be produced simultaneously with the molding of the holder. Therefore, the number of parts is not increased and the production cost is not raised.

On the other hand, the lens is welded to the holder with low-melting glass. This welding is conducted by dropping an annular low-melting glass compact obtained by press-molding powder of low-melting glass into an annular shape, onto a step portion of an inner wall of the holder, the step portion being between the lens and the holder, and by thereafter conducting heat melting processing. During the process of dropping the annular low-melting glass compact, fine pieces or powder of glass are scattered and adhere to the surface of the lens. When such pieces or powder melt and spread, local films are formed. During the use of a prolong period, the thin deposit may absorb moisture in the outside air to be devitrified (clouded). According to the invention, even when such a local film of low-melting glass is formed, a moisture protective film is formed under this state or immediately after the welding, on faces of the lens and a glass pool, the faces opposing the opening of the holder. The low-melting glass is covered by the moisture protective film, and hence moisture does not penetrate to the low-melting glass, with the result that the devitrification phenomenon does not occur. Furthermore, the formation of cracks in the surface of the glass pool can be prevented from occurring. Therefore, an optical module which exhibits high reliability for a long period can be obtained.

The moisture protective film may be formed by conducting vapor deposition processing while arranging a number of holders each incorporating a lens, in a film growth chamber. Consequently, the optical module can be easily produced. Particularly, the holder may have a structure in which the opening is wide and shallow. In this structure, since the deposition material can be sufficiently supplied to the faces of the lens and the glass pool, an excellent moisture protective film of a desired thickness can be efficiently formed.

In the case where a spherical lens is used in an optical module, the spherical lens is mounted to a holder under the state where a moisture protective film or an optical filter film is not formed on the surface (i.e., under a bare state). Under this state, therefore, the spherical lens has no directionality and can be easily mounted without adjusting the direction. When a number of holders each incorporating a spherical lens as described above are arranged in a film growth chamber and vapor deposition is conducted, a desired optical filter film can be formed in a portion of the surface of each spherical lens which is required for performing the function of the lens (i.e., the vicinity of the point where the surface intersects the optical axis). In this case, the film thickness in the peripheral portion of the face of the spherical lens which opposes the opening of the holder is smaller than that of the center portion of the face. When the optical values are set with respect to the center portion, however, it is possible to obtain necessary and sufficient properties. In the case of a spherical lens, only a range of about 30% of the face which is around the optical axis relates to the optical coupling. Consequently, the film formed by the production method of the invention does not produce any problem in function. When the holder is structured so that the opening is wide and shallow, the deposition material can be sufficiently supplied to the surface of the spherical lens, and hence an excellent thin film can be efficiently formed.

DETAILED DESCRIPTION OF THE PREFERRED EMBODIMENTS

Figure 1:
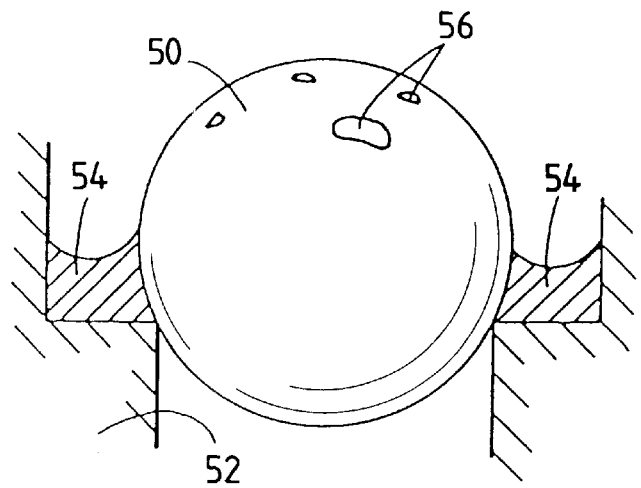
FIG. 1 is a diagram illustrating problems of the conventional optical module.
Figure 2:
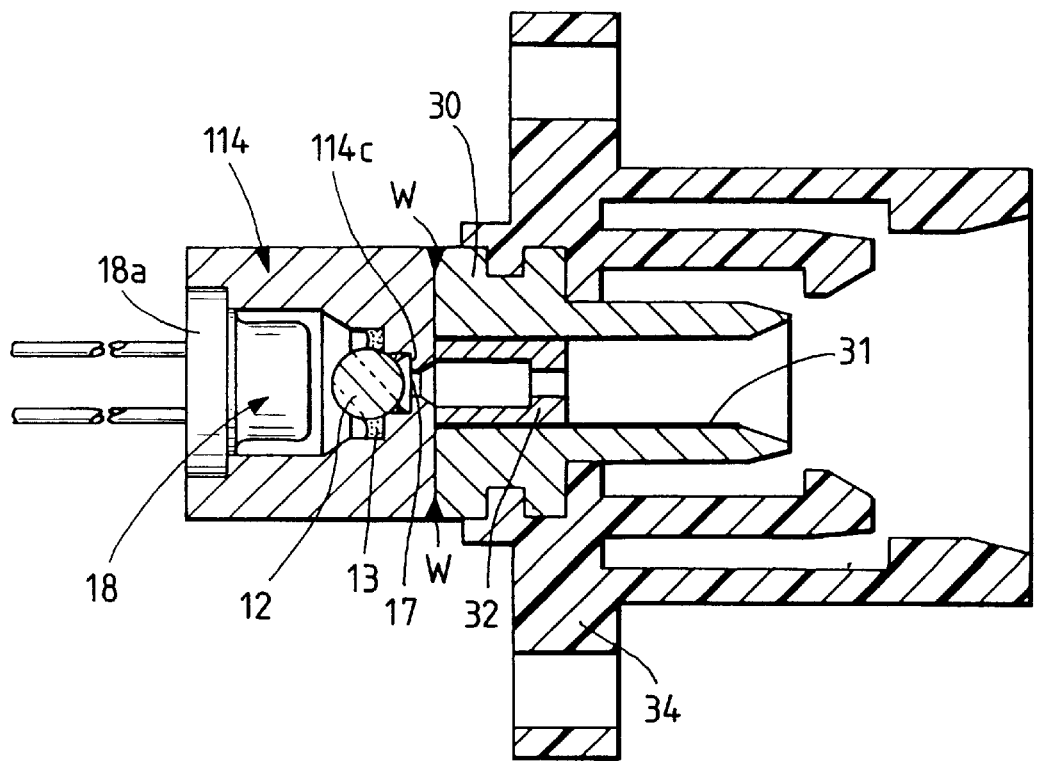
FIG. 2 is a section view showing an embodiment of the optical module of the invention.
Figure 3:
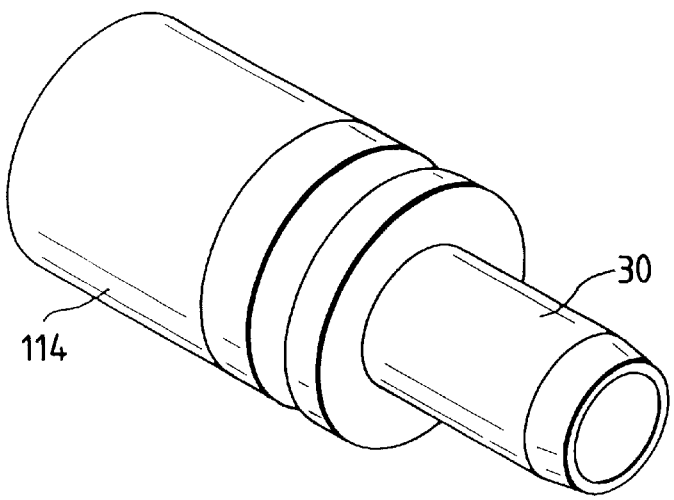
FIG. 3 is a perspective view of the body of the optical module.

FIG. 2 is a section view showing an embodiment of the optical module of the invention, and FIG. 3 is a perspective view of the body of the optical module. The optical module includes a semiconductor light emitting device 18, a spherical lens 12, a holder 114 which holds the semiconductor light emitting device 18 and the spherical lens 12, and a receptacle core 30 onto which a ferule of a counter optical plug is to be fitted.

Figure 4:
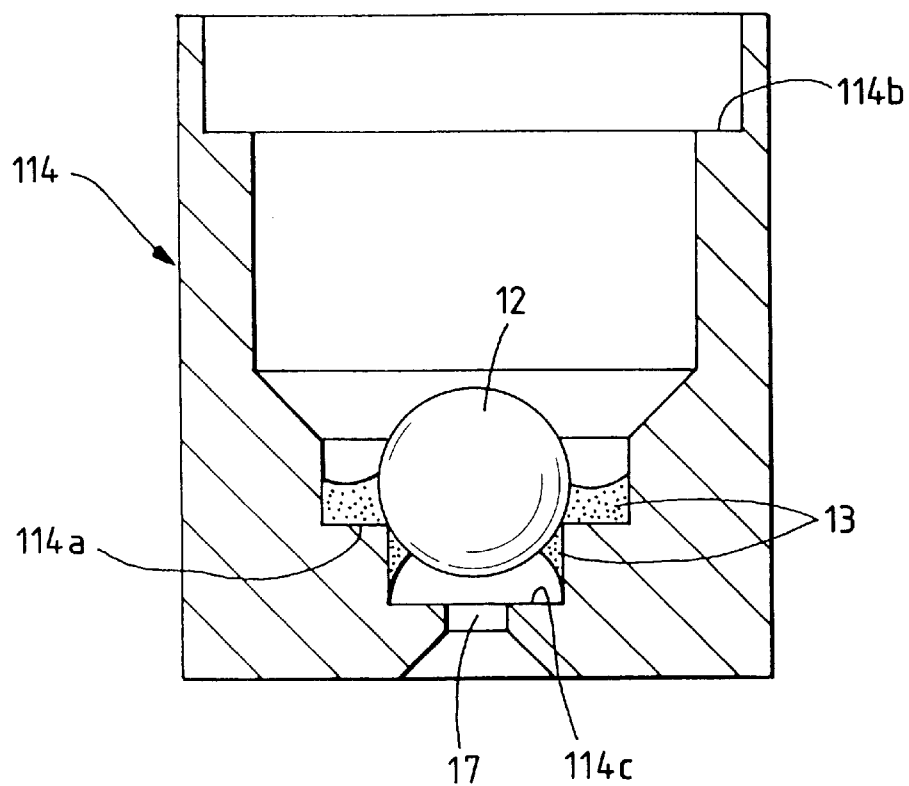
FIG. 4 is a detailed section view showing an example of a holder used in the invention.

FIG. 4 shows in detail the structure of the holder 114. The holder 114 is a member which is made of stainless steel or the like and has a substantially cylindrical shape. The holder has a structure in which the inner wall has a first step portion 114a for attaching the spherical lens 12, a second step portion 114b for attaching the semiconductor light emitting device, and a third step portion 114c for forming a circular opening 17. The formation of the third step portion 114c is a feature of the invention. When the spherical lens 12 is dropped into the holder 114, the spherical lens 12 is supported by the edge of the first step portion 114a, whereby the center of the spherical lens 12 is automatically made coincident with the center axis (optical axis) of the holder 114. Next, low-melting glass (having a melting point of, for example, about 365° C.) obtained by press-molding powder into an annular shape is dropped into the space between the spherical lens 12 on the first step portion 114a and the holder 114. The mounting sequence may be inverted, or the annularly molded low-melting glass may be first mounted and then the spherical lens 12 may be dropped. The assembly is placed in an oven and then subjected to a heat treatment at about 400° C. The spherical lens 12 is fixed to the holder 114 by the low-melting glass 13 which melts as a result of the heat treatment.

As illustrated, when the glass melts, part of low-melting glass in a molten state penetrates with passing through the gap between the spherical lens 12 and the first step portion 114a, and then solidifies. Incident light is diffracted or scattered by the penetrating glass, thereby causing the light to leak toward the emission side of the spherical lens 12.

The semiconductor light emitting device 18 is coupled to the holder 114 into which the spherical lens 12 is incorporated. The semiconductor light emitting device 18 is positioned by pressingly fitting the base portion 18a of the package into the second step portion 114b of the holder 114, and then fixed to the holder by an adhesive, the YAG laser welding, or the like. In the embodiment, the mounting position of the semiconductor light emitting device 18 is determined by the machined dimensions of the holder 114, and the centering in the direction of the optical axis is not performed.

The receptacle core 30 is a cylindrical integral member which is made of stainless steel (for example, SUS304). A high-hardness film 31 of TiC or the like having a thickness of 1 to 10 $\mu$m is formed by the CVD (Chemical Vapor Deposition) method, on at least the inner peripheral face of the bore of the receptacle core. A ferule stopper 32 is mounted at the basal end of the bore of the receptacle core 30.

Under the state where the receptacle core 30 is centered with respect to the holder 114, the receptacle core is fixed to the holder by the YAG laser welding (welded portions are indicated by W). As a result, the body of the optical module shown in FIG. 3 is obtained. As required, a connector housing 34 made of plastic is mounted on the outer periphery of the body of the optical module.

When the optical plug is connected to the optical module, a ferule of the optical plug is fitted into the bore of the receptacle core 30 and a plug frame of the optical plug is fitted with the connector housing 34, thereby establishing a mechanical coupling. Under this state, the optical alignment and coupling are simultaneously attained so that light emitted from the semiconductor light emitting device 18 is converged by the spherical lens 12 so as to be convergently incident on the end face of the optical fiber in the ferule.

Figure 5:
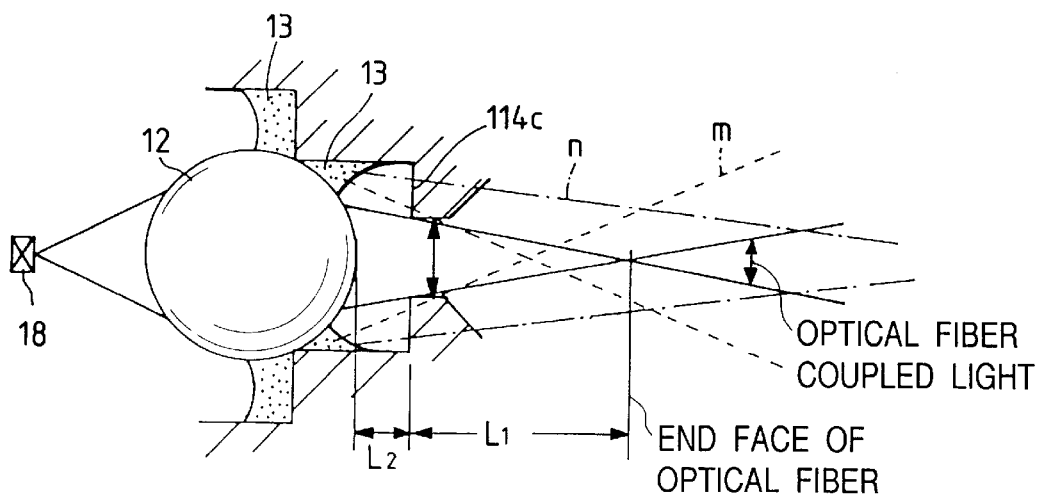
FIG. 5 is a diagram showing the design concept of an opening in the invention.

The third step portion 114c which is disposed at a position which is on the emission side of the spherical lens 12 with respect to the contacting position of the holder 114 and the lens performs the function of eliminating (blocking) undesired light due to the aberration of the spherical lens itself, and also that due to diffraction and scattering which are produced by the low-melting glass 13 penetrating from the contacting position of the spherical lens 12 and the holder 114. The manner of performing the function is shown in FIG. 5. As described above, light emitted the semiconductor light emitting device 18 is diffracted by the spherical lens 12 and converged on the end face of the optical fiber. However, undesired light is produced in addition to the optical fiber coupled light (indicated by solid lines). Such undesired light includes light (indicated by broken lines m) due to the aberration of the spherical lens itself, and that (indicated by one-dot chain lines n) due to diffraction and scattering which are produced by the low-melting glass 13 used in the glass welding. When the optical fiber is pulled out from the optical module, there may be a fear that also the coupling undesired light (m and n) is emitted. The coupling undesired light passes a portion which is separated from the center of the spherical lens. As described above, therefore, the step portion 114c for forming the circular opening 17 is formed in the whole periphery and at a position of the holder 114 which is on the emission side of the lens with respect to the contacting position of the holder and the spherical lens 12. According to this configuration, the coupling undesired light which is disposed to pass the peripheral portion is blocked. Even when the optical fiber is pulled out from the optical module, therefore, the coupling undesired light is little emitted to the outside, and the emitted light consists of substantially only the optical fiber coupled light.

Figure 6:
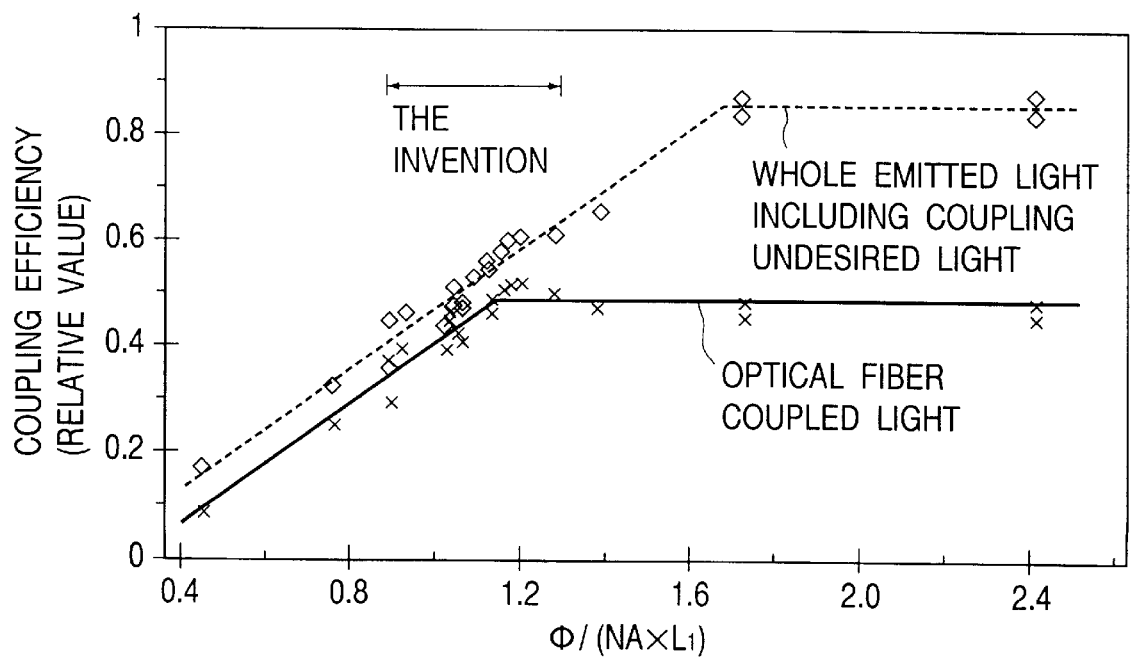
FIG. 6 is a graph showing relationships between $\phi/(NA \times L_1)$ and coupling efficiencies.

In the invention, preferably, the circular opening is set so as to satisfy the following expressions:

$$0.9 < \phi/(NA \times L_1) < 1.3 \text{ and } L_2 < L_1/2$$

where $\phi$ is the diameter of the opening, NA is the numerical aperture of the optical fiber, $L_1$ is the distance in the optical axis direction between the opening end on the side of the lens and the optical fiber, and $L_2$ is the distance in the optical axis direction between the end of the lens and the opening end on the side of the lens. The former expression can be obtained from the graph of FIG. 6 which shows relationships between $\phi/(NA\times L_1)$, and the coupling efficiency of the optical fiber coupled light and that of the whole emitted light including the coupling undesired light. The difference between the two efficiencies indicates the amount of the coupling undesired light. When $\phi/(NA\times L_1)$ is 0.9 or less, also the optical fiber coupled light is blocked by the step portion. By contrast, when $\phi/(NA\times L_1)$ is large or 1.7 or more, ambient light cannot be blocked. Actually, it is desired to reduce the emitted amount of the coupling undesired light, and decrease the optical fiber coupled light to a level as low as possible. In some cases, even if the optical fiber coupled light is somewhat reduced, the coupling undesired light is desired to be cut off. Eventually, it is preferable to set the value of $\phi/(NA\times L_1)$ to be within the range of 0.9 to 1.3 as described above. More preferably, the value of $\phi/(NA\times L_1)$ is set to be within the range of 1.0 to 1.3. In FIG. 6, a difference is made between the coupling efficiency of the whole emitted light including the coupling undesired light and that of the optical fiber coupled light, in the range where $\phi/(NA\times L_1)$ is 1.1 or less. This difference is caused by the shape of the opening (in other words, due to the phenomenon that the spot shape of the actual emitted light is not circular but usually elliptical), and does not cause a serious problem. The difference can be made smaller by forming the opening into an elliptical shape so as to coincide with the spot shape of the emitted light. In this case, however, the formation of an elliptical opening increases the production cost, and the step of centering must be conducted in order to align the spot shape with the elliptical opening.

The restriction of $L_2<L_1/2$ is imposed in order to set the position of the step portion for eliminating the coupling undesired light not to be a position closer to the end face of the optical fiber but to be that closer to the end of the lens. According to this configuration, the diameter of the circular opening can be considerably increased, and the accuracy of the formation of the opening in a direction perpendicular to the optical axis is not required to be so severe. Therefore, the opening can be formed economically and easily. Furthermore, the tolerance of the eccentricity of the laser chip can be moderated. In an actual product of a semiconductor light emitting device, the eccentricity of the laser chip (the deviation perpendicular to the optical axis when the chip is attached to the package) is allowed to be about ±80 $\mu$m with respect to the center position of the package. When the radiation optical axis of the laser is deviated from the lens center, the lens transmitted light is deviated in angle and part of the light is blocked by the step portion for eliminating the coupling undesired light. However, the reduction of the amount of light coupled to the optical fiber can be suppressed to a level as low as possible by setting the position where the circular opening is formed, to a position closer to the vicinity of the end of the lens. In other words, even when an actual product in which the eccentricity of the laser chip exists at a certain degree is used as it is, light emitted from the semiconductor light emitting device can be coupled with the optical fiber.

In the embodiment, the receptacle core is an integral member which is made of stainless steel and a high-hardness film is formed on at least the inner peripheral face of the bore of the receptacle core. Alternatively, another structure such as that in which a ceramic sleeve is fitted into the receptacle core may be employed. The lens may be a rod lens or the like, in place of the spherical lens. In the case of a rod lens, the emission end face of the lens functions as the contacting position of the lens and the holder. As required, an optical filter film, or a moisture protective film which is selected from films of various kinds may be formed on the surfaces of the lens, particularly the surface on the incidence side.

As described above, according to the invention, a step portion which forms a circular opening is disposed at a position which is on an emission side of a lens with respect to a contacting position of the lens and a holder which holds the lens, and hence most of the coupling undesired light which is not related to the coupling with an optical fiber can be eliminated (blocked). As a result, the optical design can be performed so as to meet a laser safety standard (such as laser apparatus class 1) while maximizing the utilization of the amount of incident light of the optical fiber. Furthermore, also scattering light due to changes with age (such as devitrification) of a fixing material for lens fixation can be eliminated. According to the invention, therefore, a complex shutter mechanism such as the open fiber control is not necessary, and the configuration is simple, with the result that a design which can satisfy a desired laser safety standard surely and at a low cost is enabled.

Next, an embodiment of the method of producing an optical module of the invention will be described.

Figure 7A:
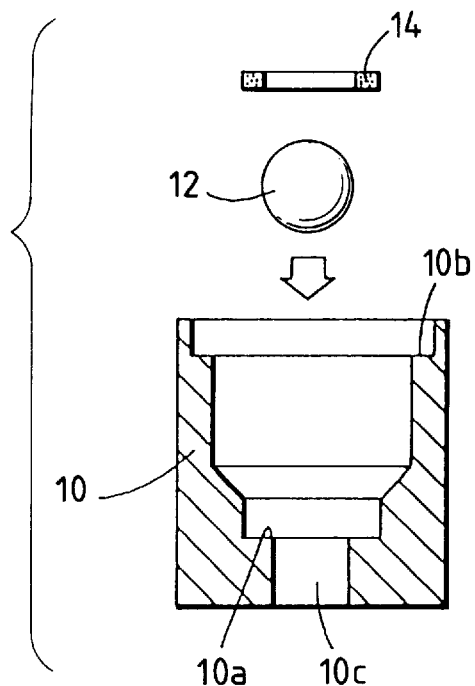
FIGS. 7A to 7D are diagrams illustrating an example of the production process of the optical module of the invention.
Figure 7B:
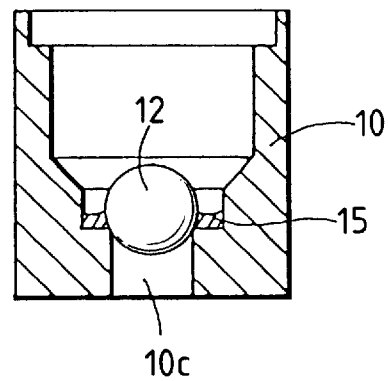
Figure 7C:
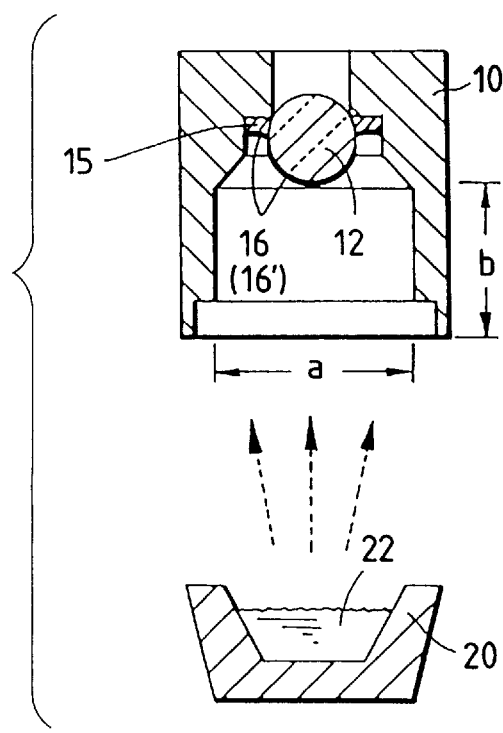
Figure 7D:
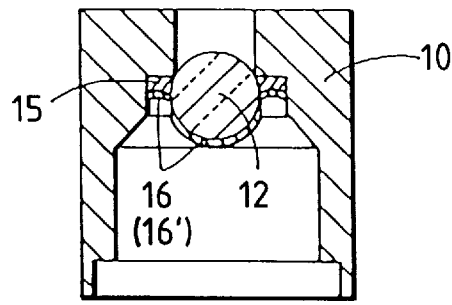
Figure 8A:
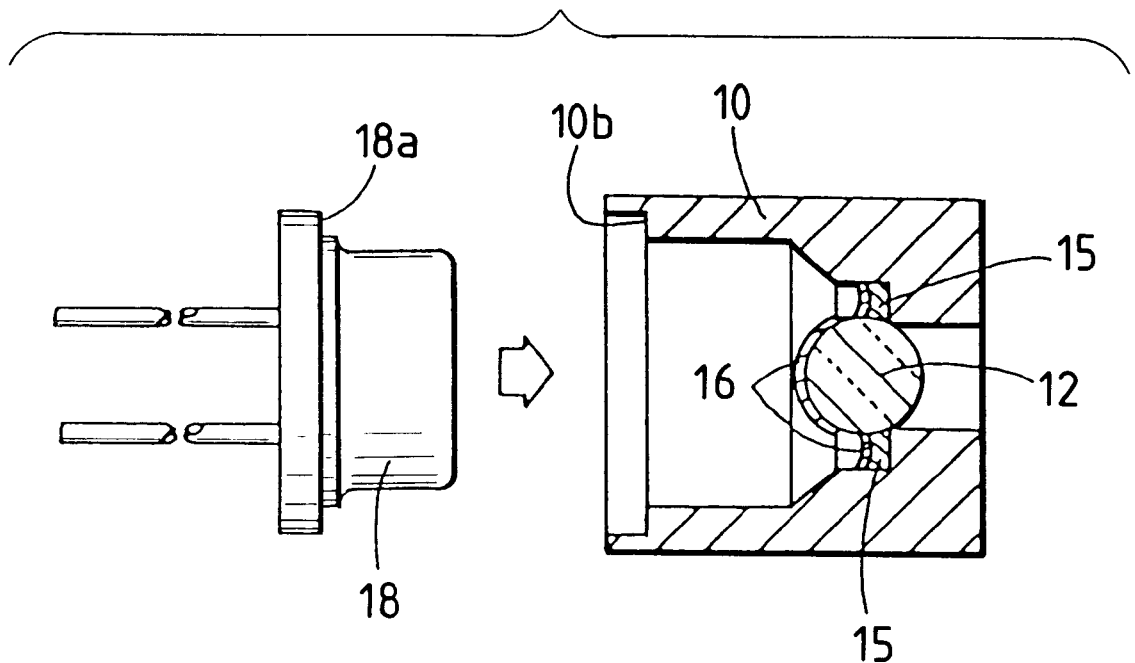
FIG. 8A and 8B are diagrams illustrating a structure in which the holder and an optical semiconductor device are coupled with each other.
Figure 8B:
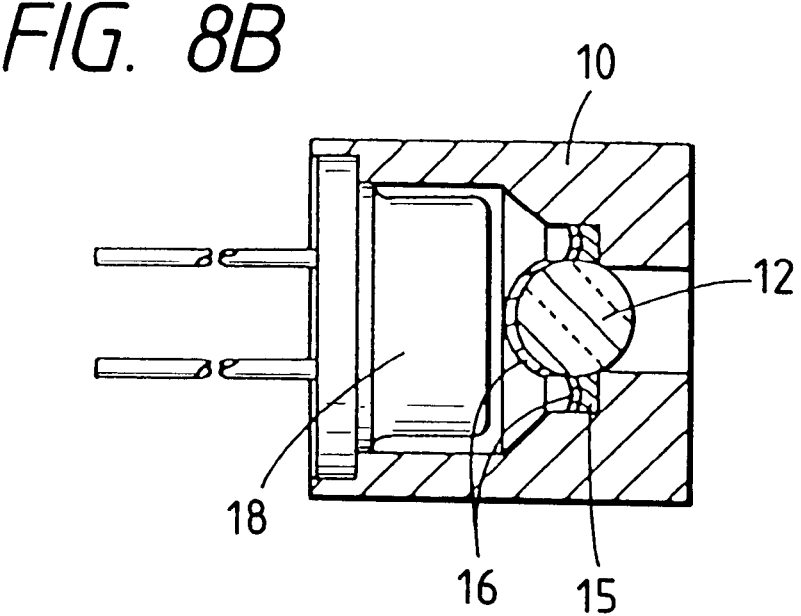

FIGS. 7A to 8B are process diagrams illustrating an embodiment of the method of producing an optical module of the invention. FIGS. 7A to 7D show the production process conducted until the completion of a holder incorporating a lens, and FIG. 8A and 8B show the process of coupling the holder incorporating a lens with an optical semiconductor device. Also in the embodiment, a spherical lens is used as the lens.

As shown in FIG. 7A, first, the spherical lens 12 is mounted in a holder 10. The holder 10 is a member which is made of stainless steel or the like and has a substantially cylindrical shape. The holder has a structure in which the inner wall has a first step portion 10a for attaching the spherical lens 12, and a second step portion 10b for attaching a hermetically sealed optical semiconductor device (not shown). When the spherical lens 12 is dropped into the holder 10, the spherical lens 12 is supported by the edge of the first step portion 10a because the diameter of the lens is larger than the diameter of a circular through hole 10c formed at the front end portion of the holder, whereby the center of the spherical lens 12 is automatically made coincident with the center axis of the through hole 10c. Next, an annular low-melting glass compact 14 is dropped into the space between the spherical lens 12 on the first step portion 10a and the holder 10. The annular low-melting glass compact 14 is a member which is obtained by press-molding low-melting glass (having a melting point of, for example, about 365° C.) into an annular shape. The mounting sequence may be inverted, or the annular low-melting glass compact 14 may be first mounted and then the spherical lens 12 may be dropped.

The assembly is placed in an oven and then subjected to a heat treatment at about 400° C. The annular low-melting glass compact 14 melts as a result of the heat treatment and the spherical lens 12 can be glass-welded to the holder 10 as shown in FIG. 7B. The glass pool is designated by 15. After the spherical lens is welded to the interior of the holder as described above, a moisture protective film 16 is formed on faces of the spherical lens 12 and the glass pool 15 by the vacuum deposition method, the faces opposing the opening of the holder. Specifically, a deposition material (for example, $SiO_2$ or MgF) 22 required for the film growth is placed in a crucible 20, and heated by the electron beam method or the resistance heating, so that the deposition material is evaporated and deposited on the surfaces of the spherical lens 12 and the glass pool 15. As a result, the moisture protective film 16 is formed on the faces of the spherical lens 12 and the glass pool 15, the faces opposing the opening of the holder. See FIG. 7D. In order to efficiently grow the film on the surfaces of the spherical lens 12 and the glass pool 15, the holder is preferably shaped so that the ratio a/b of the diameter a of the opening of the holder to the depth b from the opening to the spherical lens is 1 or more. A preferred example of the moisture protective film 16 is an $SiO_2$ film of a thickness of about 30 to 200 nm.

In the same manner as the above-mentioned method of forming the moisture protective film 16, an optical filter film 16' may be formed.

Specifically, in the same manner as the above-mentioned method, a deposition material required for the growth of the optical filter film is placed in the crucible 20, and heated by the electron beam method or the resistance heating, so that the deposition material is evaporated and deposited on the surfaces of the spherical lens 12. As a result, the optical filter film 16' is formed. See FIG. 7D.

It is a matter of course that a film is formed also on the inner wall face of the holder unless a measure such as a masking process is taken. Since the film is very thin, and hence there arises no serious problem.

As the optical filter film formed in the embodiment, for example, an ND filter film which adjusts the light transmittance, an antireflection coat film, or the like may be used. An ND filter film which adjusts the light transmittance is used for adjusting the amount of emitted light and the slope efficiency in order to satisfy a safety standard for a laser product. The material for the film growth is a metal having an optical absorption property, such as chromium, titanium, aluminum, silver, or a Ni—Cr—Fe alloy, and has a function of attenuating light. When a current the level of which is higher than the threshold level is supplied to a laser diode, light emitted from the laser diode increases in proportion to the current. The slope of the output level is called the slope efficiency. The slope can be moderated by lowering the light transmittance. When a filter film of metal chromium (in a thickness of about 500 Å) is formed, for example, the transmittance for light of a wavelength of 780 nm is about 45%, and the slope efficiency is reduced to approximately one half. In this way, the amount of light emitted from the laser diode can be apparently adjusted by the ND filter film. In the case of an antireflection coat film, a dielectric multilayer film is formed. For example, an antireflection property is obtained by alternatingly forming $TiO_2$ and $SiO_2$ into a multilayer structure.

Next, as shown in FIGS. 8A and 8B, the holder 10 into which the spherical lens 12 is incorporated is coupled with the optical semiconductor device 18 which is housed in a hermetically sealed package. The moisture protective film 16 has been formed on the surfaces of the spherical lens 12 and the glass pool 15 in the procedure shown in FIGS. 7A to 7D. The optical semiconductor device 18 is positioned by pressingly fitting the base portion 18a of the package into the second step portion 10b of the holder 10, and then fixed to the holder by an adhesive, the YAG laser welding, or the like. The mounting position of the optical semiconductor device 18 is determined by the machined dimensions of the holder 114, and the centering in the direction of the optical axis is not performed. As a result, the optical module shown in FIG. 8B is obtained. As required, a coupling structure in which the centering in the direction of the optical axis can be performed may be employed.

In the case where a laser diode is incorporated as the optical semiconductor device, the combination of the optical semiconductor device and the lens such as shown in FIG. 8B can provide an optical collimator which may be used as a light source in a bar code reader.

Figure 9:
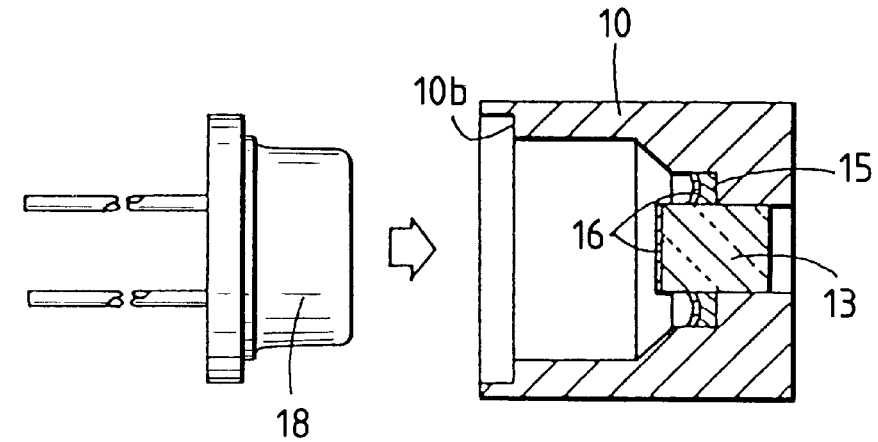
FIG. 9 is a diagram illustrating another example of the optical module produced in accordance with the invention.

FIG. 9 shows an example in which a rod lens is used in place of the spherical lens. Fundamental structure and procedures are the same as those shown in FIGS. 7A to 8B. Therefore, corresponding portions are designated by the same reference numerals, and their detailed description is omitted. A rod lens 73 is fitted into the holder 10, and welded to the holder by heating and melting low-melting glass. The glass pool is designated by 15. The moisture protective film 16 is formed on one end face of the rod lens 73 and the surface of the glass pool 15.

In the case where a laser diode is incorporated as the optical semiconductor device, the combination of the optical semiconductor device and the lens such as shown in FIG. 8B can provide an optical collimator which may be used as a light source in a bar code reader.

Figure 10:
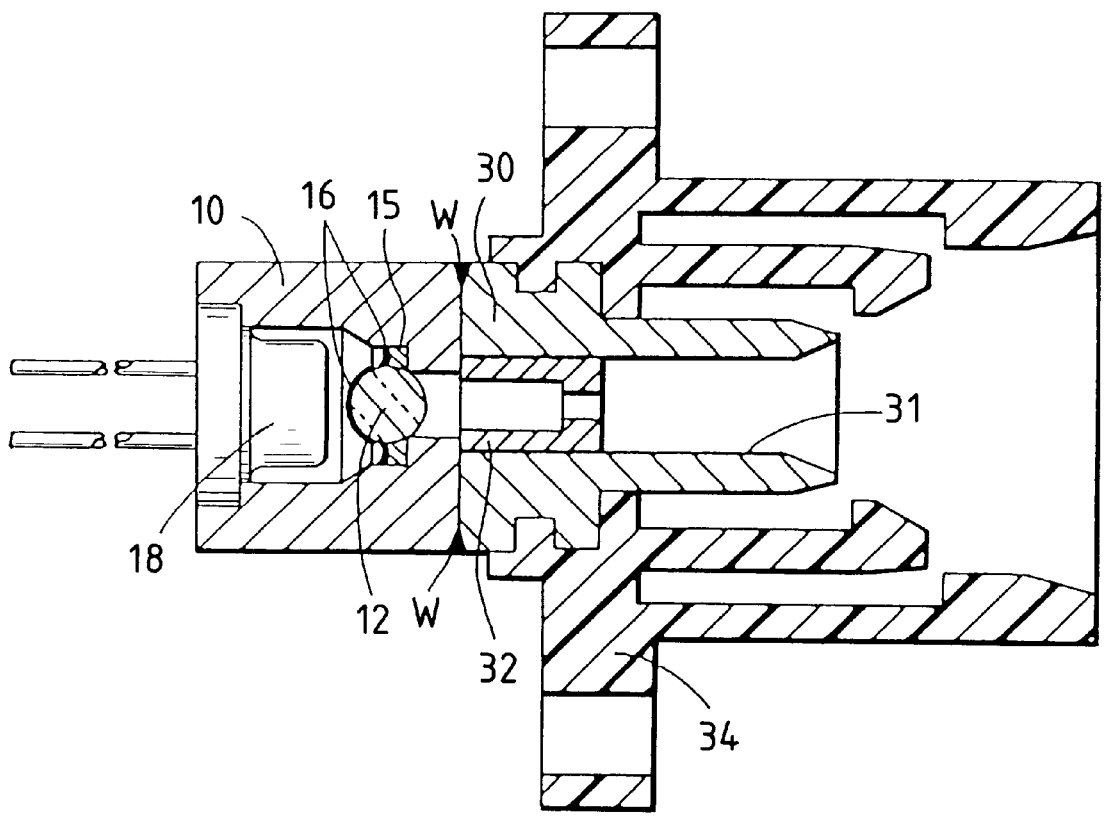
FIG. 10 is a diagram illustrating another example of the use of the optical module produced in accordance with the invention.

FIG. 10 shows another example of the configuration of an optical connector. The example has a receptacle core 30 onto which a ferule (not shown) of a counter optical plug is to be fitted, in addition to the optical module shown in FIG. 8B. The receptacle core 30 is a cylindrical integral member which is made of stainless steel (for example, SUS304). The high-hardness film 31 of TiC or the like is formed by the CVD (Chemical Vapor Deposition) method, on at least the inner peripheral face of the bore of the receptacle core. The ferule stopper 32 is mounted at the basal end of the bore of the receptacle core 30. Alternatively, another structure such as that in which a ceramic sleeve is fitted into the receptacle core in place of the formation of the high hardness film may be employed. Under the state where the receptacle core 30 is centered with respect to the holder 10, the core is fixed to the holder by the YAG laser welding (welded portions are indicated by W). The ferule of the optical fiber is fitted into the receptacle core 30. The amount of light emitted from the optical fiber, or that of light detected by a semiconductor light receiving device is monitored. The accurate centering in the direction of the matching faces is conducted. At the coupling position where the peak is obtained, the assembly is irradiated with a YAG laser beam so as to be spot-welded. The connector housing 34 made of plastic is mounted on the outer periphery of the optical module. When this optical connector is to be used, a ferule of a counter optical plug is fitted into the bore of the receptacle core 30 and a plug frame of the optical plug is fitted with the connector housing 34, thereby establishing a mechanical coupling. Under this state, the optical alignment and coupling between the optical semiconductor device and the a optical fiber in the ferrule are simultaneously attained.

When a semiconductor light emitting device such as a laser diode is incorporated as the optical semiconductor device, a light emitting device for an optical LAN in which light emitted from the laser diode is converged by the spherical lens to enter the optical fiber in the ferrule can be configured. When a semiconductor light receiving device such as a photodiode is incorporated in place of a semiconductor light emitting device, a light receiving device for an optical LAN can be configured.

Figure 11:
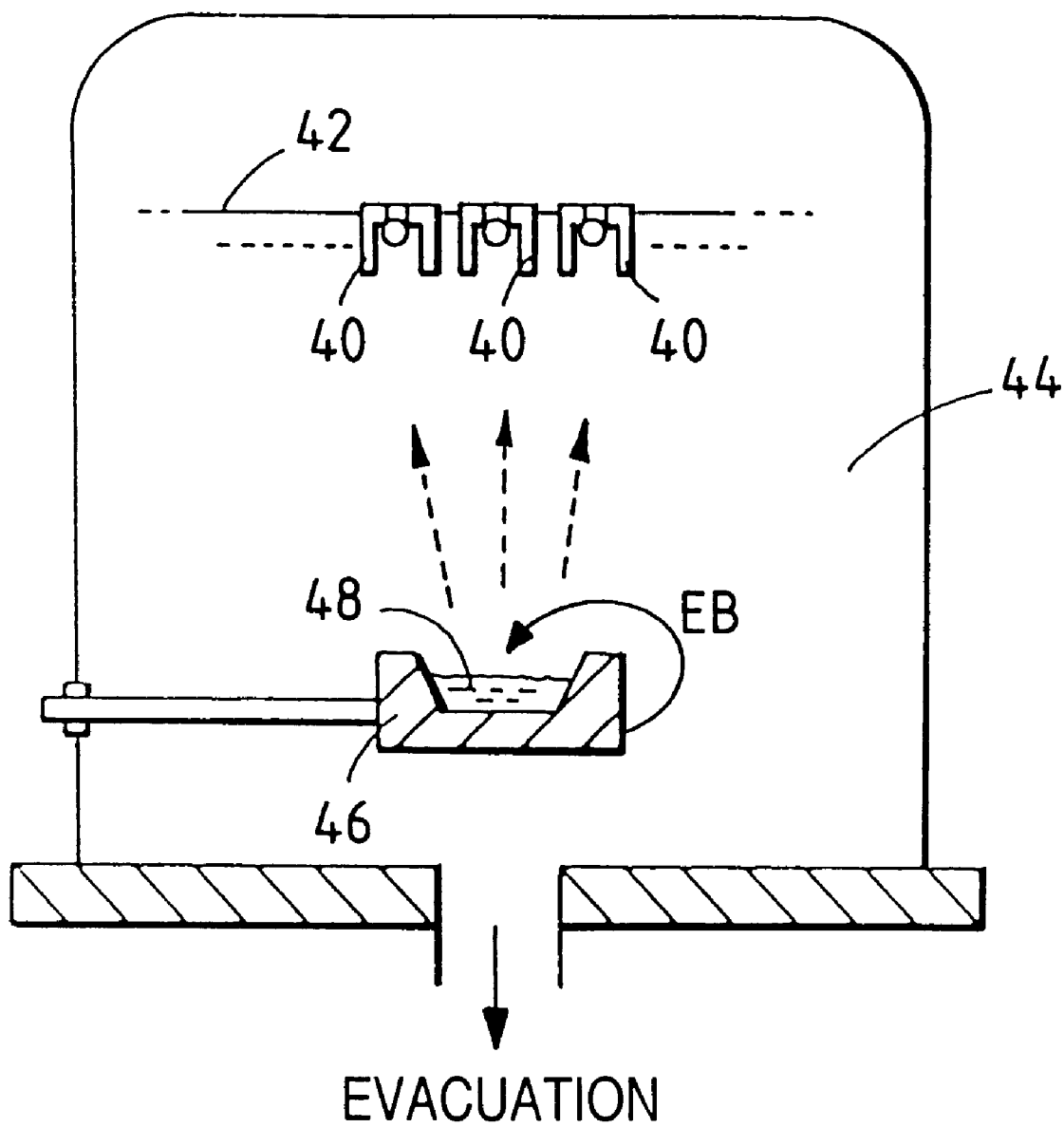
FIG. 11 is a diagram illustrating a step of forming a moisture protective film on a spherical lens welded to a holder.

Next, the method of forming a moisture protective film according to the invention will be described in more detail with reference to FIG. 11. Initially, a number of samples 40 in each of which a spherical lens is welded to the interior of a holder with using low-melting glass (i.e., in the state shown in FIG. 7B) are prepared. Even when fine powder of the low-melting glass adheres to the surface of the spherical lens during the process of producing the samples, there arises no problem. The samples are arranged on and fixed to a fixture 42 or the like so that, in each sample, the face of the spherical lens opposing the opening of the holder is downward directed. The samples and the fixture are set in a film growth chamber 44 for vacuum deposition. A crucible 46 is disposed below the samples. A required deposition material (for example, $SiO_2$ or MgF) 48 is placed in the crucible 46. The chamber is then evacuated by a vacuum pump (not shown) to a desired high vacuum state, and the material is heated by the electron beam (EB) method, resistance heating, or the like. Since the thin film material is heated and evaporated in a high vacuum, evaporation particles are deposited on the surfaces of the spherical lens and the glass pool, with the result that a thin film is formed on the surfaces. The thickness of the thin film is controlled so as to be about 30 to 200 nm. As a result, a film of $SiO_2$ or the like is formed on the surface of the lens (in the case where low-melting glass adheres to the surface, the surface covering the glass), and that of the glass pool. The film prevents moisture in the outside air from entering the low-melting glass. Therefore, the low-melting glass is not devitrified. The film growth may be conducted by using the sputtering method in place of the vacuum deposition method.

In a similar manner as the above-mentioned method of forming a moisture protective film, an optical filter film can be formed. When an optical filter film is to be formed, a required deposition material (for example, chromium or titanium) 48 is placed in the crucible 46 used in the method of forming a moisture protective film. An optical filter film having desired properties can be obtained by suitably selecting the thin film material and controlling the film thickness. The optical filter film can sufficiently exhibit the optical properties as far as it is formed in the center portion of the spherical lens (i.e., the vicinity of the point where the surface of the spherical lens intersects the optical axis). Even when the film formation area on the surface of the spherical lens is small, therefore, there arises no serious problem in the optical properties. Depending on the material to be grown, the sputtering method may be used in place of the vacuum deposition method.

The ND filter film which adjusts the light transmittance and which is formed as the optical filter film is a metal film formed by depositing a film growth material such as chromium or titanium in a thickness of, for example, several tens of millimeters. When the film is exposed as it is to the outside air, therefore, it may be oxidized. This oxidation can be effectively avoided by taking the following countermeasure. After a required optical filter film is formed under the state shown in FIG. 7C, a moisture protective film is formed on the optical filter film in a similar technique. The metal film is protected by the moisture protective film and high reliability can be ensured for a long period.

As described above, in the method of producing an optical module of the invention, a lens is welded to the interior of a holder with using low-melting glass, and thereafter a moisture protective film is formed on faces of the lens and a glass pool, the faces opposing an opening of the holder. Even when fine pieces or powder of low-melting glass adhere to the surface of the lens, they are finally covered by the moisture protective film. Therefore, the devitrification phenomenon of the low-melting glass does not occur, and the light amount is not reduced even in a use of a long period. Since also the surface of the glass pool is covered by the moisture protective film, fine cracks due to moisture absorption can be prevented from occurring, and the lens can be held surely and firmly. Also from this point of view, reliability for a long period can be extremely enhanced.

As described above, the method of producing an optical module of the invention can be applied also to the formation of an optical filter film. In the embodiment described above, mainly, a spherical lens is used as the lens of the optical module. The use of a spherical lens has an advantage that the direction adjustment is not required because a spherical lens on which an optical filter film or a moisture protective film is not formed is mounted in the optical module. A spherical lens can be easily mounted with using the feature that a spherical lens is originally free from directionality, and the spherical lens is already fixed to the interior of the holder. Therefore, the lens can be easily fixed and held during the process of forming an optical filter film, and prevented from being damaged by careless handling or the like after the film growth. It is not necessary to process the lens in a subsequent production stage. Therefore, there is no factor of increasing the cost, and an optical module can be produced at a very low cost.

What is claimed is:

1. An optical module, comprising:

an optical semiconductor device;

a lens;

a holder having first and second openings, said lens being fixed to an interior of said holder, said first and second openings optically communicating with each other through said lens, said optical semiconductor device being connected to said first opening, said second opening having a step portion for eliminating coupling undesired light, said step portion forming a circular opening; and a receptacle core fixed to said holder on the side of said second opening, said receptacle core to be fitted with a ferule of a counter optical plug, wherein, when said optical module is connected to said counter optical plug, said optical semiconductor device is optically coupled with an optical fiber of said ferule.

2. The optical module of claim 1, wherein said optical module satisfies the following expressions:

$$0.9<\phi/(NA*L_1)<1.3 \text{ and } L_2<L_1/2$$

where $\phi$ is a diameter of said circular opening, NA is a numerical aperture of said optical fiber, $L_1$ is a distance in an optical axis direction between an end of said circular opening on the side of said lens and an end face of said optical fiber, and $L_2$ is a distance in the optical axis direction between an end of said lens and the end of said circular opening on the side of said lens.

3. The optical module of claim 1, wherein a ferule stopper having a hole communicating with said second opening is mounted at a basal end of a bore of said receptacle core, and said step portion is positioned between said lens and said ferule stopper.

4. The optical module of claim 1, wherein said step portion of said second opening has a portion which flares from said circular opening in a direction of a light emission.

5. The optical module of claim 1, wherein said lens is a spherical lens.

6. An optical module, comprising:

an optical semiconductor device;

a lens;

a holder having first and second openings, said lens being secured within said holder, said first and second openings optically communicating with each other through said lens;

a coating formed on said lens at said first opening of said holder, said coating being selected from the group consisting of moisture protective films and optical filter films;

means for securing said optical semiconductor device to said first opening of said holder;

a receptacle core fixed to said holder on the side of said second opening, said receptacle core to be fitted with a ferule of a counter optical plug, wherein, when said optical module is connected to said counter optical plug, said optical semiconductor device is optically coupled with an optical fiber of said ferule; and means for blocking undesired light emanating from said lens, said means for blocking undesired light having a centrally located circular opening of a smaller diameter than said second opening of said holder.

7. The optical module of claim 6 wherein said lens is spherical.

8. The optical module of claim 6 wherein said lens is a rod.

9. The optical module of claim 6 wherein said coating is a moisture protective film.

10. The optical module of claim 6 wherein said coating is an optical filter film.

11. The optical module of claim 6 wherein said holder includes a step portion positioned between said first and second openings and wherein said lens is secured within said holder at said step portion.

12. The optical module of claim 11 further comprising a glass material positioned at said step portion for securing said lens within said holder.

* * * * *